United States Patent
Lindbloom

(10) Patent No.: US 7,990,381 B2
(45) Date of Patent: Aug. 2, 2011

(54) RE-COLORING A COLOR IMAGE

(75) Inventor: Bruce J. Lindbloom, Eden Prairie, MN (US)

(73) Assignee: Corel Corporation, Ottawa (CA)

( * ) Notice: Subject to any disclaimer, the term of this patent is extended or adjusted under 35 U.S.C. 154(b) by 319 days.

(21) Appl. No.: 11/514,481

(22) Filed: Aug. 31, 2006

(65) Prior Publication Data

US 2008/0068377 A1    Mar. 20, 2008

(51) Int. Cl.
*G06T 15/50* (2011.01)

(52) U.S. Cl. ......... 345/426; 345/581; 345/586; 345/589

(58) Field of Classification Search ................ 345/426, 345/586

See application file for complete search history.

(56) References Cited

U.S. PATENT DOCUMENTS

| | | | | |
|---|---|---|---|---|
| 5,408,595 A | * | 4/1995 | Tajima | 345/591 |
| 5,537,638 A | * | 7/1996 | Morita et al. | 345/426 |
| 5,680,327 A | | 10/1997 | Cook et al. | |
| 5,914,724 A | * | 6/1999 | Deering et al. | 345/607 |
| 6,429,867 B1 | * | 8/2002 | Deering | 345/423 |
| 6,434,269 B1 | | 8/2002 | Hamburg | |
| 6,567,098 B1 | * | 5/2003 | D'Amora | 345/611 |
| 2002/0080136 A1 | * | 6/2002 | Kouadio | 345/426 |
| 2005/0219241 A1 | | 10/2005 | Chun | |
| 2006/0028469 A1 | * | 2/2006 | Engel | 345/426 |
| 2007/0176940 A1 | * | 8/2007 | Maxwell et al. | 345/589 |

OTHER PUBLICATIONS

International Search Authority, U.S. Patent and Trademark Office, PCT International Search Report (Form PCT/ISA/210) for international application No. PCT/US06/34564, May 23, 2007, 2 pages.
International Search Report (Form PCT/ISA/210), prepared by U. S. Patent and Trademark Office as International Search Authority, for international application PCT/US06/34420, Jul. 10, 2007, 2 pages.

* cited by examiner

*Primary Examiner* — Xiao M Wu
*Assistant Examiner* — Phi Hoang
(74) *Attorney, Agent, or Firm* — The Law Office of Michael E. Kondoudis

(57) ABSTRACT

Technology for re-coloring a region of a color image including determining an original base color in a region of a color image; establishing at least one shading parameter in the region of the color image; and combining a new base color with the at least one shading parameter in the region of the color image thereby producing a re-colored region of the color image.

12 Claims, 7 Drawing Sheets

Fig. 5A
Fig. 5B

RE-COLORING A COLOR IMAGE

BACKGROUND

The patent or application file contains at least one drawing executed in color. Copies of this patent or patent application publication with color drawing(s) will be provided by the Office upon request and payment of the necessary fee.

Color images such as digital photographs are currently editable in a variety of ways. For example, it is often desirable to change the color of an object in a digital photograph; however, it can be difficult to achieve realistic results, especially when the new color has a substantially different luminance or lightness than that of the original color. Also difficult is appropriately separating the base color from the shading characteristics or retaining the shading characteristics of the original. Existing solutions based on general color editing tools require considerable experience, skill and experimentation. Many coloring algorithms have filters that can be useful for these tasks, such as those known as Colorize, Hue/Saturation/Lightness and Hue Map. However, these have not been well suited to the re-coloring of an object in an image because they rely on the skill, experience and tenacity of the user. The best choice in any particular situation may depend upon the re-coloring task at hand. Even when the best filter is chosen, it can be difficult to adjust the controls to give the desired appearance. Moreover, it is often the case that desired results cannot be obtained.

A practical example of this problem may be that of an online clothing merchandiser offering a particular style of a particular garment, but in several base fabric colors. It could prove beneficial to such an enterprise to have the ability to easily create digital images which could alternatively show any of a range of available colors, but without the need to take multiple photographs. A practical benefit would be obtained if they were able to easily, realistically and accurately change the color, after-the-fact, from a single photograph of a model.

SUMMARY

Implementations described and claimed herein address the foregoing and other situations by providing technology for re-coloring a region of a color image including a methodology of operations which may include determining an original base color in a region of a color image; establishing at least one shading parameter in the region of the color image; and/or combining a new base color with the at least one shading parameter in the region of the color image thereby producing a re-colored region of the color image.

Thus, this technology relates generally to the field of digital image editing, or to an application that is used to edit digital raster images, and more specifically relates to the fields of color editing and/or color correction. As a general concept, this technology fits a physical shading model to the distribution of colors found in an object or region of an image. Such a model would then be able to separate the single base color of the object or region from the parameters of a shading model that cause tone variations in the image. In this way, this invention can then provide for simply removing the base color, substituting a different base color, and then re-rendering the image using the shading model along with the extracted shading parameters, and/or use the base color elsewhere.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

FIG. 1 illustrates example operations for implementation of image re-coloring.

FIG. 2, which includes sub-part FIGS. 2A and 2B, provides views of a region of a color image as originally colored and as re-colored, both with a shading characteristic.

FIG. 3, which includes sub-part FIGS. 3A and 3B, provides views of a region of a color image as devoid of color, respectively with and without a shading characteristic.

FIG. 4, which includes sub-part FIGS. 4A, 4B, 4C, 4D and 4E, provides respective views of a region of an originally-colored image, the color and a shading parameter separated and a new color and the shading parameter applied thereto.

FIG. 5, which includes sub-part FIGS. 5A and 5B, provides views of a color image and a region thereof as originally colored and as re-colored.

DETAILED DESCRIPTION

Technology is described herein for re-coloring one or more regions of a digital color image. This technology is particularly useful for identification of the base color (whether for color replacement, mere removal to gray-scale, or for re-use otherwise) as well as for retaining shading characteristics of the original image regardless of the re-colorization to be performed. As will be readily understood, such technology may be useful for a great many re-coloring operations, whether for color removal, re-colorization or color matching, inter alia.

Figure 1:
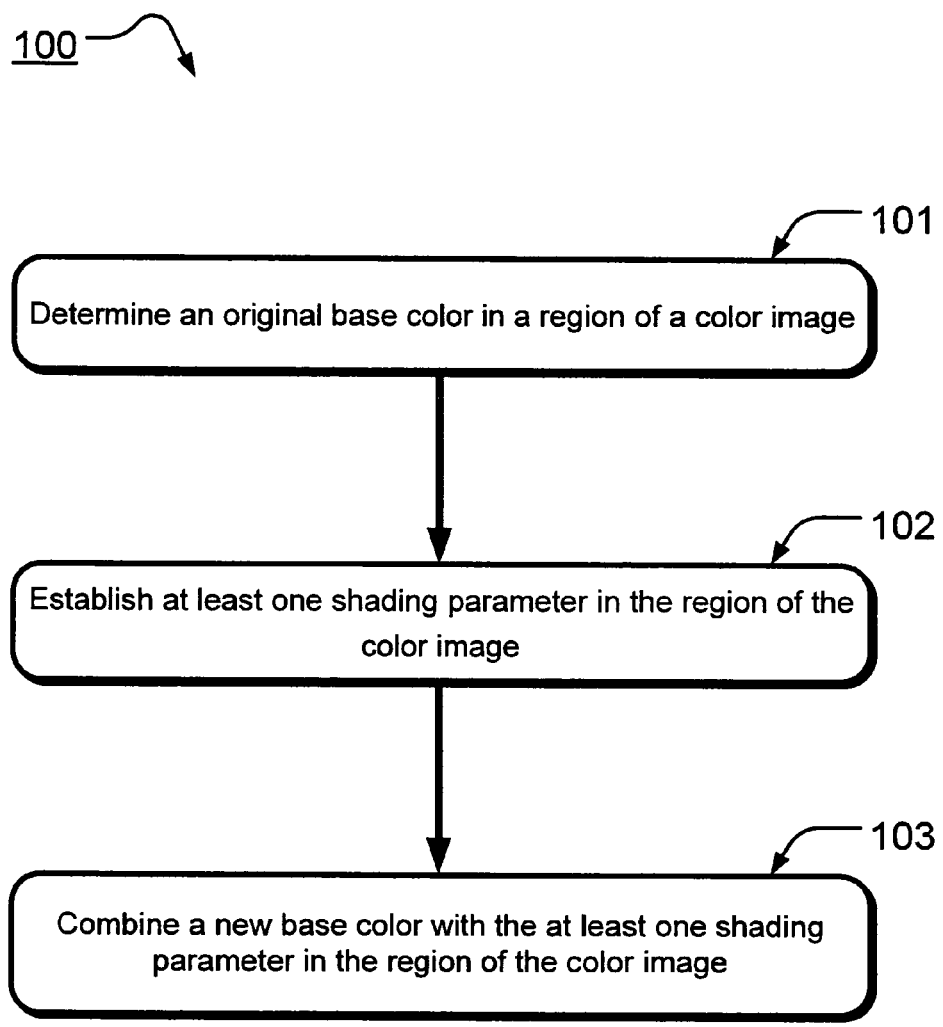

FIG. 1 illustrates an example methodology 100 for re-coloring a region of a color image, yet retaining one or more shading characteristics thereof. Such a method 100 may include operations 101, 102 of respectively determining an original base color in a region of a color image, and, establishing at least one shading parameter in that region. The shading parameter or parameters may account for an image shading variation of the original base color. These operations 101, 102 may occur sequentially, either one before the other, or they may occur substantially simultaneously. In any event, thereafter, a new base color may be combined, per operation 103, with the at least one shading parameter in the region of the color image. This can thereby produce a re-colored region retaining the image shading variation in a realistic re-coloring of the color image.

In some implementations, a method for re-coloring a region of a color image hereof may include analyzing the color content of the region to determine either or both a base color and the shading parameters for a shading model. The shading parameters would typically account for observed or observable variations of the base color. Note, the base color may be a single representative color of the object or area of the identified region of the image. The method may further include combining (or otherwise applying) the determined shading parameters and shading model with a new base color, thereby producing the same types of variations found in the original image region. The result would generally be producing a second, re-colored region. Note, the combining of shading parameters and a new base color may occur directly in the original image area, as after the identification and removal of the original base color, or may occur separate from the original image region to create a new region which may then replace the original region with the new region. In any case, an end result may be the production of a realistic re-coloring of the original image.

As set forth in more detail below, the determination of the original base color and the establishment of the shading parameter can involve a shading model, or mathematical relationship derived from the physics of light and color. Such an analysis may be performed on a selection of original image colors, as for example, on a pixel-by-pixel basis in a region of a digital color image. An original base color for the region can be deduced from this analysis along with one or more shading parameters. Some of the one or more shading parameters may be constants and others may vary throughout the selection. This analysis and the model thereof may be thought of as separating the base color from the shading parameter or parameters. After the analysis, then a user-supplied color (or texture map) can be applied as a replacement for the original base color and the selection then re-rendered using the shading parameters. Either or both of the analysis and/or the re-rendering process can be fully automated.

Figure 2A:
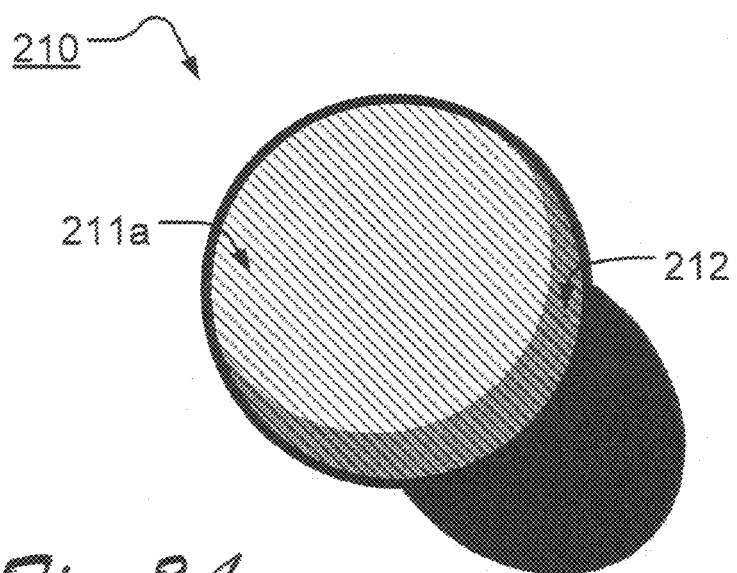
Figure 2B:
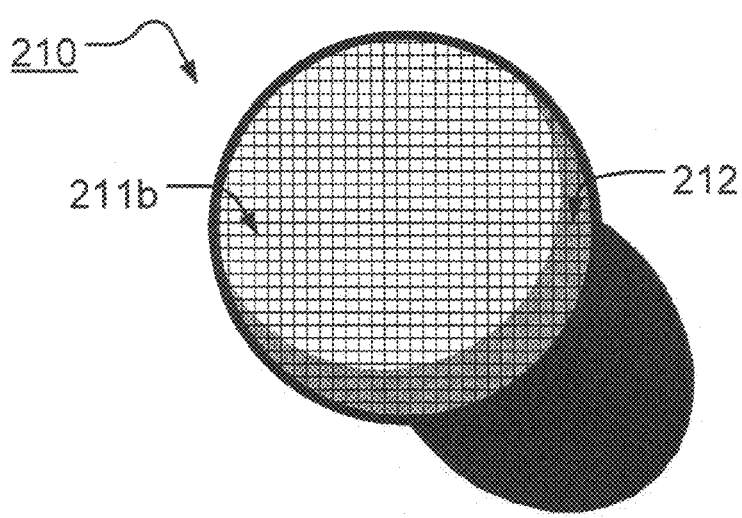
Figure 3A:
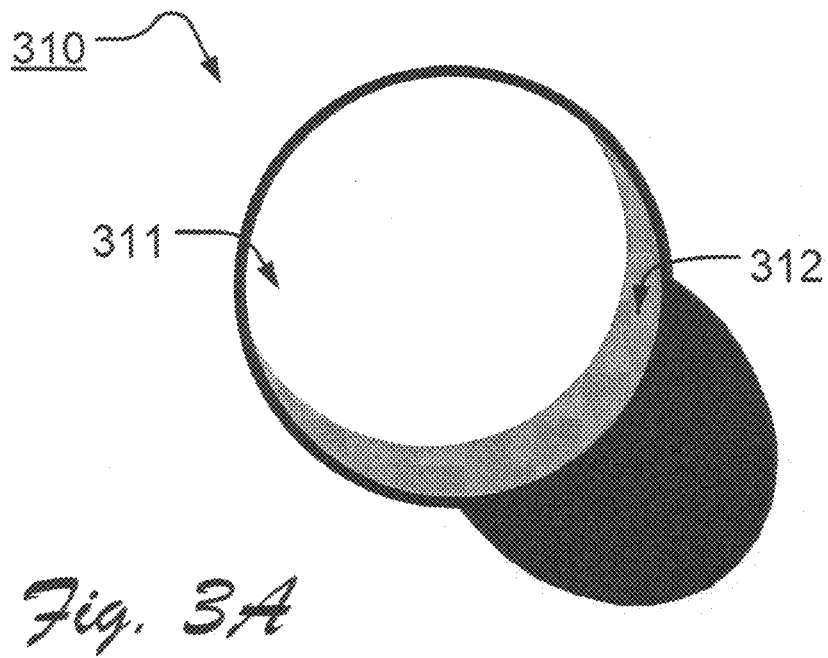
Figure 3B:
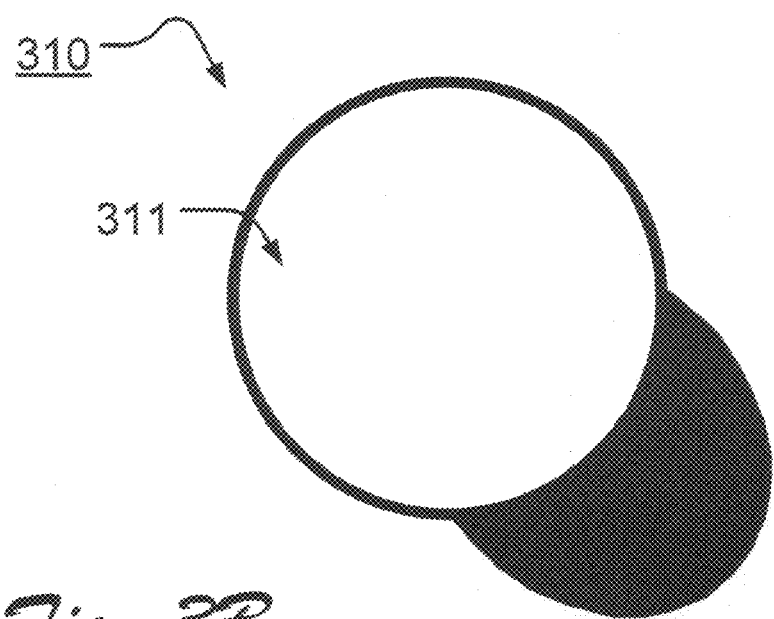

As a first example, FIG. 2 provides a representation of a region of a color image, here a three-dimensional sphere or ball 210. This ball 210 has a color and a shading characteristic (the shadow external of the ball is shown merely to emphasize the three dimensional quality of the ball). In FIG. 2A, the base color is identified by the general reference numeral 211a and is represented by the hatch marking (which according to convention represents the color green). The shading characteristic is identified in the ball by the reference numeral 212. In FIG. 2B, the base color of the ball 210 has been changed as identified by the new reference numeral 211b and the distinct cross-hatch marking (here corresponding by convention to the color yellow). The shading characteristic 212 has been retained. Note, as shown in FIG. 3, in some alternative implementations hereof which will be further described below, the base color may simply be removed leaving a white or other neutral coloring 311 in the ball (see both FIGS. 3A and 3B). In one such alternative, see FIG. 3A, the shading characteristic 312 has been retained, and in another alternative, see FIG. 3B, the shading characteristic has also been removed leaving only the neutral coloring 311.

Figures 4A, 4B, 4C, 4D, 4E:
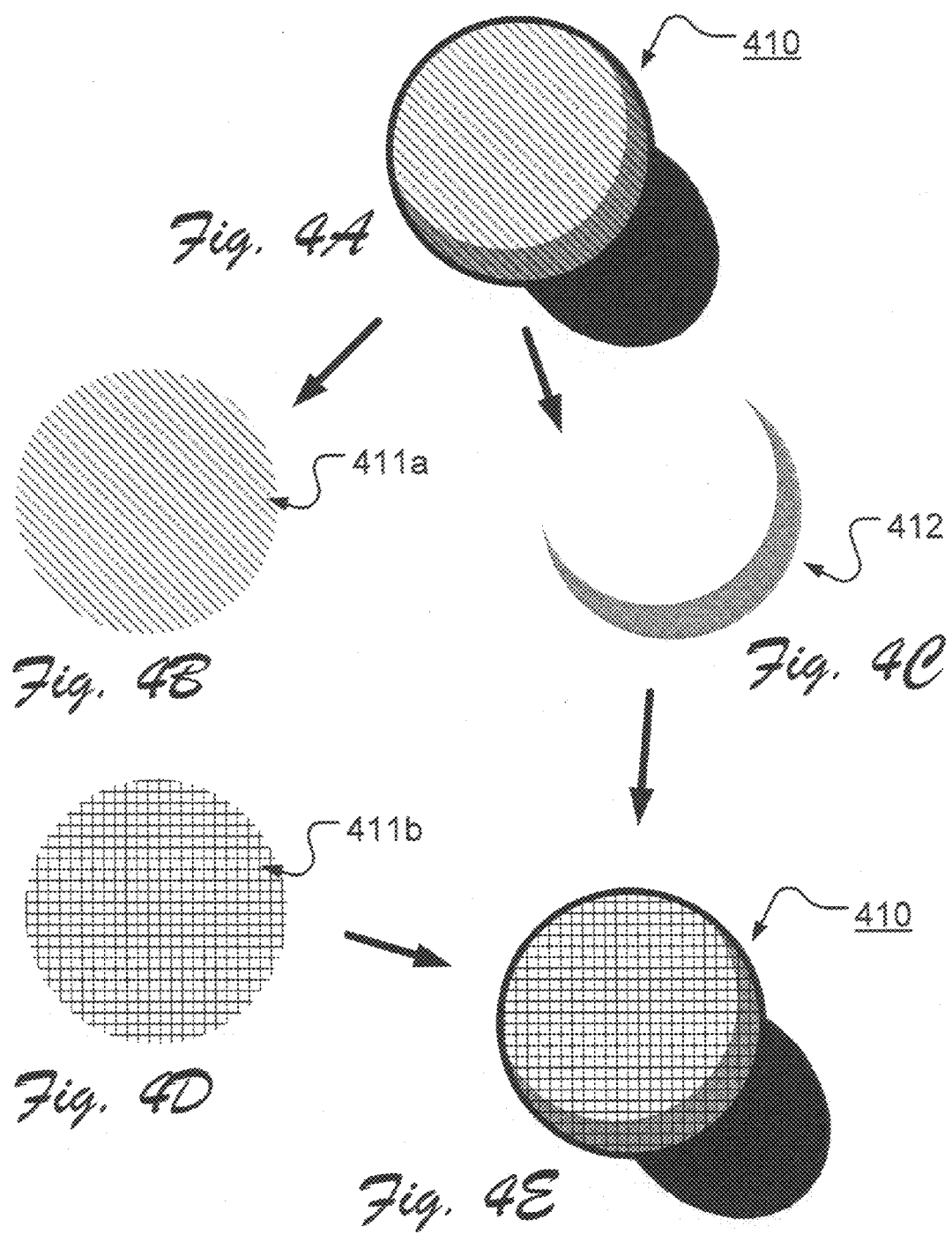

FIG. 4 provides a schematic representation of a methodology for making a color change. The ball 410 of FIG. 4A has the original base color 411a, see FIG. 4B, and the shading characteristic 412, see FIG. 4C, identified and separated from each other. Then, a new base color 411b, see FIG. 4D, can be applied, here with the shading characteristic 412 to the ball 410 as shown in FIG. 4E to produce a new colorized version of the image region here defined by the ball 410. Note the respective hatching and cross-hatching color representations of FIGS. 4B, 4D and 4E in going from an original green color (hatching shown in FIG. 4B) to yellow (cross-hatching of FIGS. 4D and 4E) even though the respective original base color 411a and shading characteristic 412 are shown in FIGS. 4B and 4C as having been taken out of or away from the ball 410 of FIG. 4A, this is but one schematic implementation hereof. Other implementations may involve leaving either or both the original base color and/or the shading characteristic in the image region during, and perhaps even after the conversion to the new base color. These and other implementations are described in further detail below.

As a further example, consider a selection made of a colored coat as shown in FIG. 5. More specifically, shown in FIG. 5A is a digital image 510 with a variety of original base colors for the separate elements. For example, the cloth of the coat is just a single base color 511a, dyed at the factory when it was made. When the coat appears in an image, color variations are seen because of the interplay between the shape of the fabric and the lighting (see e.g., the varied shading characteristics 512a indicated in and resulting from the folds of the sleeve of FIG. 5A). The process hereof provides for separating the base color from the shading characteristics, which may be represented by a shading model as described below; then a new base color could be inserted, together with the shading model to produce a re-colored image as shown in FIG. 5B. In FIG. 5B, the image 510 has a region thereof, i.e., the coat, re-colored with a new color 511b which nevertheless retains the original shading characteristics, see characteristics 512b in FIG. 5B. Examples of the typical types of images that may be involved herewith may include those where the color image is a two-dimensional pixel array often representing a three-dimensional scene captured with a digital camera, scanner or rendering program or other digital creation or capture means. Moreover, the region within such an image may correspond with one or more actual objects in the 3D scene that are made of a single base color (e.g., the color of the fabric from which a garment is made, see FIG. 5).

In one implementation, the methodology hereof may involve an analysis using physical relationships of light and color, particularly operating in the energy domain, thus typically referring to the Energy, E, thereof. A starting point in the derivation of the relationships which may be used here can be with a simple shading model that has ambient and diffuse terms. Thus, presented here is a physical shading model (also referred to herein as an ambient/diffuse shading model) to accomplish realistic re-coloring based on a physical shading model for representing the original image. Such a model may include an ambient term:

$$E_{ambient} = E_{light} E_{base}$$

where the ambient energy is the result of the energy from a non-directional light, after reflecting off the object. The surface or base color of the object selectively absorbs the incident light energy (thus the multiplication of the light and base terms). Also included may be a diffuse term:

$$E_{diffuse} = E_{light} E_{base} \cos \theta$$

which is similar to the ambient term except that it has a directional component, θ, which represents the angle formed between the surface normal vector ($\bar{N}$) and the vector ($\bar{L}$) toward the light source in the image. In computer graphics renderings, this may typically be computed from the dot product of these two unit vectors:

$$\cos \theta = \bar{N} \cdot \bar{L}.$$

The total energy is the sum of the ambient and diffuse components:

$$E_{total} = k_{ambient} E_{ambient} + k_{diffuse} E_{diffuse}$$

where k represents the relative contributions of each of the ambient and diffuse components. This may be simplified by constraining the sum of the contributions:

$$k_{ambient}+k_{diffuse}=1$$

which gives $$E_{total}=(1-k_{diffuse})E_{ambient}+k_{diffuse}E_{diffuse}.$$

This model handles surfaces that can be rendered as any combination of ambient and diffuse components. The relationship of ambient to diffuse components may be represented as totaling one hundred percent (100%). Thus, if an object presents a first percent of an ambient component, the corresponding diffuse component will be a second percent of 100 minus the first percent. Most objects in the real world will present an ambient contribution of 0 to 20 percent, and a corresponding diffuse contribution of 80 to 100 percent. Then, assuming that the light in an image here is white:

$$E_{light}=1$$

which leaves:

$$E_{total}=(1-k_{diffuse})E_{base}+k_{diffuse}E_{base}\cos\theta$$

which further simplifies to the final result:

$$E_{total}=E_{base}(1+k_{diffuse}(\cos\theta-1)).$$

This equation is revealing in a variety of ways. First, it accomplishes the intended separating of the base surface color from the shading characteristics, $E_{base}$, represents the base color and the term $k_{diffuse}(\cos\theta-1)$ represents the shading characteristic or characteristics. In this sense, the equation establishes the shading model that with a base color renders the actual image color (the image color in a digital image being represented by a base color attenuated by a shading characteristic quantity). With the $E_{base}$ definition of the base color, this may therefore represent the original base surface color in the initial analysis, this original base color then being relatively simple to remove as a quantity from this equation, and then perhaps replaced with a new, different base color. Re-rendering the image with the new base color will then produce an image with a new color and retained shading characteristics.

Even so, the determination of the base surface color and the shading parameters may further involve the following. Note, the base surface or base color $E_{base}$ and the diffuse contribution $k_{diffuse}$ may typically be constants or considered substantially as such for a particular image or region thereof, particular in any particular rendering. The value for $\theta$ will, on the other hand, typically vary pixel-by-pixel. Thus, an estimate of all of these values may be developed by examining the color distribution in a selection or region of an image to be recolored.

Typically, the brightest color ($E_{maximum}$) will be that part of the object that is facing directly or most directly toward the light source in the rendered image. With this, at this point, the angle, $\theta$ (the angle between the surface normal vector and the vector toward the light source), will equal or substantially be equal to zero ($\theta=0$), and then, the $\cos(\theta)=1$. This causes terms to cancel out of the simplified final $E_{total}$ equation ($E_{total}=E_{base}(1+k_{diffuse}(\cos\theta-1))$), leaving the surface color as:

$$E_{base}=E_{maximum}.$$

Following a similar development, the darkest color ($E_{minimum}$) in the selection will be that part of the object that is in total or the most nearly total shadow of the light source.

At this point, $\theta=\pi/2$ degrees and $\cos(\theta)=0$. From this, the diffuse contribution may be estimated from the simplified final ($E_{total}$) equation as:

$$k_{diffuse}=\frac{E_{maximum}-E_{minimum}}{E_{maximum}}.$$

Then, by substitution, an estimate of $\theta$, or actually $\cos(\theta)$, for each pixel may be determined from the pixel's energy, $E_i$:

$$\cos\theta_i=\frac{E_i-E_{minimum}}{E_{maximum}-E_{minimum}}$$

Applying this process to the selection of the green coat of FIG. 5A may yield the following information in an RGB colorspace: the base surface color may be something like (0, 205, 0) in sRGB, the diffuse contribution may be 0.989, and the ambient contribution 0.011. Changing to a new base color of brown (RGB=139, 35, 35) can yield a result of a new color 511b like that depicted in the image 510 of FIG. 5B.

Note, the ambient/diffuse shading model can be operated on a pixel to pixel basis for each of however many channels (whether a single or a multiple channel colorspace is used). Thus, the color model equation may then be as follows:

$$E_{c,total}=E_{c,light}E_{c,base}(k_{ambient}+k_{diffuse}\cos\theta_i)$$

which under the assumptions $$E_{c,light}=1$$

$$k_{ambient}+k_{diffuse}=1$$

simplifies to $$E_{c,i}=E_{c,base}(1+k_{diffuse}(\cos\theta_i-1))$$

where $\theta$ is the angle formed between the surface normal of the object in the scene at pixel i and the vector from that object pointing toward the dominant light source in the scene. Note, the subscript c indicates the color channel (e.g. R, G or B in an RGB colorspace) and i represents a pixel within the region.

Furthermore, as before, the base color $E_{c,base}$ can be determined by identifying the maximum color of the region, where the surface faces directly towards the light source so that $\theta_i=0$ and $\cos\theta_i=1$:

$$E_{c,base}=\frac{E_{c,maximum}}{1+k_{diffuse}(\cos(0)-1)}.$$
$$=E_{c,maximum}$$

Similarly also, the diffuse coefficient $k_{diffuse}$ can be determined by identifying the minimum color of the region, where the surface faces away from the light source so that $\theta_i=\pi/2$ and $\cos\theta_i=0$:

$$E_{c,minimum}=E_{c,base}(1+k_{diffuse}(\cos(\pi/2)-1))$$

from which $k_{diffuse}$ is solved:

$$k_{diffuse}=(E_{c,base}-E_{c,minimum})/E_{c,base}$$

Note, for each pixel i in the region, the value for $\cos\theta_i$ may be computed from the shading model:

$$E_{c,i}=E_{c,base}(1+k_{diffuse}(\cos\theta_i-1))$$

which may be solved for $\cos\theta_i$ and simplified to:

$$\cos\theta_i=(E_{c,i}-E_{c,minimum})/(E_{c,base}-E_{c,minimum}).$$

A new base color, $E_{c,base}'$, can then be substituted into the shading equation $$E_{c,i}' = E_{c,base}'(1 + k_{diffuse}(\cos\theta_i - 1))$$

for each pixel in the region, producing a re-colored second region. The 'prime' in the Energy terms, $E_{c,base}'$ and $E_{c,i}'$ refers to the new color (base and total, the total color including the shading characteristics), as opposed to the original color (base and total). Again, as set forth here, the subscript c denotes this process taking place on a channel-by-channel basis; the subscript i denoting the pixel-by-pixel operation.

The methodology hereof may further involve transformation into and out of a three-dimensional, linear energy color space. For the purpose of applying the re-coloring method, the color components of the region of a color image may be transformed into and out of a three-dimensional, linear energy color space, including but not limited to linear energy RGB and CIE XYZ. Moreover, the base color and/or the shading parameters may be computed by other processes and/or using other assumptions. For example, the base color may be simply based on the brightest pixel color in the region of interest. Similarly, the shading parameters may be computed from one or more of the color components, for example, the color component showing the largest variation.

Even so, a brief set of typical assumptions is repeated here, these typically being interoperable, though some assumptions may be altered or not used in some implementations. As described, the present shading model will generally operate in the energy domain. Thus, all of the "E" values can be represented as linear energy values. This will thus be operable with conventional color images which now use an RGB working space model, and/or pixel values may be readily converted back and forth between the working space and a linear energy domain. Then, the base surface color may be represented as a vector having one or more components; if using RGB, the vector will have red, green and blue components. The diffuse contribution, $k_{diffuse}$, will generally be a scalar value. The same value should typically result regardless of the channel used; however, it may be that in practice, the diffuse component may be computed from the dominant color channel, i.e., the channel that shows the widest spread in pixel values. The $\cos(\theta)$ term will also typically be a scalar value and should similarly be computed from the dominant channel.

As mentioned, a further assumption may be that the object or region in the image is solid colored, and either or both is exposed to diffuse light or is a diffuse object like cloth, carpeting, a painted wall or the like. Another assumption may be that the object or region is illuminated by a single white light. This assumption may further include assuming that part of the object faces directly toward the light, and that part of the object is in complete shadow of the light. It is assumed that the object is not shiny or reflective. The colors sampled from a selection of a shiny object will not share a common chromaticity coordinate. The highlights or reflected colors will cause the base surface color estimation to fail, because the brightest color will tend towards white.

As a result, and in contrast with conventional coloring means such as those known as Colorize, Hue/Saturation/Lightness and Hue Map filters, which generally appear to require experimental and/or heuristic processing, the methodology presented here will generally be more automated involving a straightforward base color determination and removal with a E value replacement in easy and consistent production of realistic and natural results on the first attempt.

Figures 6, 7:
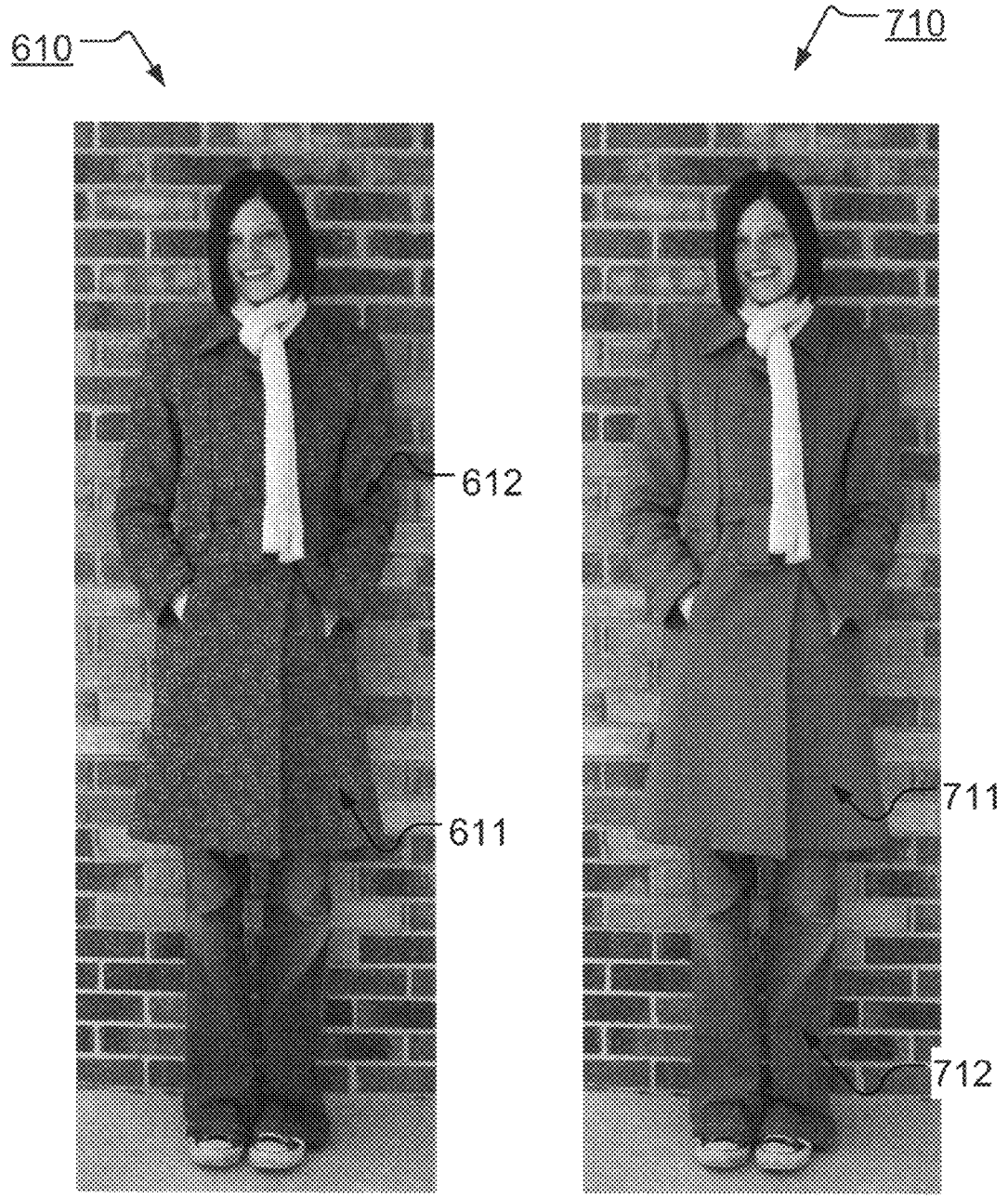
FIG. 6 is a view of a color image having a region thereof re-textured.
FIG. 7 is a view of a color image having a secondary region thereof re-colored to match the color of a primary region.

An alternative to a mere color replacement is shown in the image 610 of FIG. 6, where a texture map 611 of more than one base color is supplied to re-color the identified region while nevertheless retaining the shading characteristics, see e.g., folds 612. Thus, the new base color E value replacement may also be on a pixel-by-pixel basis, the corresponding E value being obtained from a two-dimensional texture map. Thus, although the original object will typically be a solid single color, the re-coloring process may use texture maps with a variety of color combinations and/or permutations. The new base color for each pixel may further alternatively be obtained from a procedural source, for example, algorithms that synthesize textures procedurally, such as granite, marble, wood grain or other computer-generated patterns.

Another alternative implementation involves creating a neutral color in the image, whether for a so-called "grayscale" or other use. In this the new base color can either simply not be added to the E equation, or added as a set of neutral values (e.g., in RGB (0,0,0)). The result would be a neutral or "gray" image retaining the shadow characteristic or characteristics without color in the identified region. Indeed, color in all regions of an image could similarly be removed to create an overall black and white or gray image with shadow characteristics. FIG. 3A provides one example of a colorless (i.e., color removed) image.

A further alternative may be reuse of the original base color, e.g., in applying the identified base color to other objects or regions within the same or a discrete image. Since the original base color is identified (whether extracted or otherwise) as part of the process, it may be saved and applied to other objects, thereby providing a very easy color-matching method; i.e., matching the color of the second object to that of the first. An example of this is shown in the image 710 of FIG. 7 where the color 711 is extracted from the coat and then applied to the pant legs 712. Further noteworthy is the potential to transfer color to a neutral object, something that conventional filters cannot do. Thus, the original base color could be "colorless" (e.g., colors having equal red, green and blue components such as RGB (0,0,0) or RGB (255,255,255), inter alia), however, this could, as the original base color in the $E_{total}$ equation hereof, be replaced therein, by any other new base color or color map, yet retaining the original shadow characteristics as described throughout.

The algorithm hereof may be substantially automated or automatic, though typically including a user-driven component. For a first example, the user may select the particular region of the image of which the base color will be determined (for replacement (FIG. 2B), mere removal (FIG. 3A), or re-use otherwise (FIG. 7)). When selecting a region of constant color, but different luminance (i.e. colors that share a common chromaticity coordinate), a cursor or other graphic user interface selection tool (e.g., a magic wand tool) might be used. A particularly useful such selection tool may be one that operates in a chromaticity color space such as (x, y) or (u', v').

The typical result of such implementations is, as above, and as described herein, an easy-to-use, accurate and realistic method of re-coloring objects in images. These implementations provide for identification of the base color whether for color replacement (FIG. 2B), mere removal to gray-scale (FIG. 3A), or for re-use otherwise (FIG. 7)). These may prove useful in many areas of digital imaging, particularly while still retaining the shading characteristics or other non-base color contributions to an image. As a general principle, these implementations are unique because they are based on a physical shading model rather than heuristics. In many implementations, the technology is a combination of image processing, computer graphics and color science.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Figure 8:
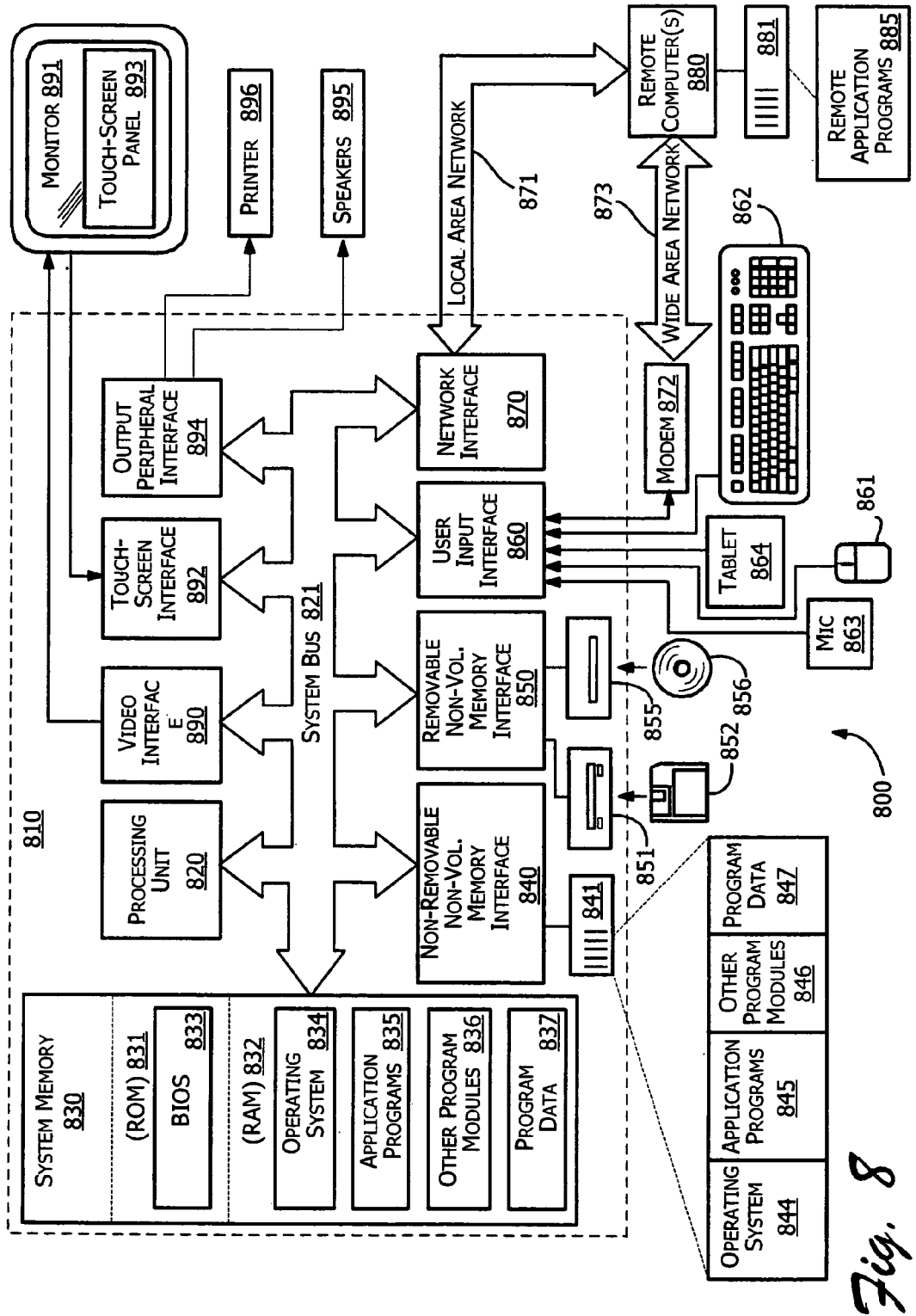
FIG. 8 illustrates a system that may be useful in implementing the described technology.

Example hardware and an operating environment are shown in FIG. 8 for implementing the technology hereof, these including a general purpose computing device in the form of a computer 820, including a processing unit 821, a system memory 822, and a system bus 823 that operatively couples various system components including the system memory to the processing unit 821. There may be only one or there may be more than one processing unit 821, such that the processor of computer 820 comprises a single central-processing unit (CPU), or a plurality of processing units, commonly referred to as a parallel processing environment. The computer 820 may be a conventional computer, a distributed computer, or any other type of computer; the invention is not so limited.

The system bus 823 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 824 and random access memory (RAM) 825. A basic input/output system (BIOS) 826, containing the basic routines that help to transfer information between elements within the computer 820, such as during start-up, is stored in ROM 824. The computer 820 further includes a hard disk drive 827 for reading from and writing to a hard disk, not shown, a magnetic disk drive 828 for reading from or writing to a removable magnetic disk 829, and an optical disk drive 830 for reading from or writing to a removable optical disk 831 such as a CD ROM or other optical media.

The hard disk drive 827, magnetic disk drive 828, and optical disk drive 830 are connected to the system bus 823 by a hard disk drive interface 832, a magnetic disk drive interface 833, and an optical disk drive interface 834, respectively. The drives and their associated computer-readable media provide nonvolatile storage of computer-readable instructions, data structures, program modules and other data for the computer 820. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 829, optical disk 831, ROM 824, or RAM 825, including an operating system 835, one or more application programs 836, other program modules 837, and program data 838. A user may enter commands and information into the personal computer 820 through input devices such as a keyboard 840 and pointing device 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port, or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 may operate in a networked environment using logical connections to one or more remote computers, such as remote computer 849. These logical connections are achieved by a communication device coupled to or a part of the computer 820; the invention is not limited to a particular type of communications device. The remote computer 849 may be another computer, a server, a router, a network PC, a client, a peer device or other common network node, and typically includes many or all of the elements described above relative to the computer 820, although only a memory storage device 850 has been illustrated in FIG. 8. The logical connections depicted in FIG. 8 include a local-area network (LAN) 851 and a wide-area network (WAN) 852. Such networking environments are commonplace in office networks, enterprise-wide computer networks, intranets and the Internet, which are all types of networks.

When used in a LAN-networking environment, the computer 820 is connected to the local network 851 through a network interface or adapter 853, which is one type of communications device. When used in a WAN-networking environment, the computer 820 typically includes a modem 854, a network adapter, a type of communications device, or any other type of communications device for establishing communications over the wide area network 852. The modem 854, which may be internal or external, is connected to the system bus 823 via the serial port interface 846. In a networked environment, program modules depicted relative to the personal computer 820, or portions thereof, may be stored in the remote memory storage device. It is appreciated that the network connections shown are examples only and other means of and communications devices for establishing a communications link between the computers may be used.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. In particular, it should be understood that the described technology may be employed in virtually all, if not indeed, all digital imaging. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

What is claimed is:

1. A method for re-coloring a region of a color image comprising:

determining an original base color in the region of the color image by implementing an ambient/diffuse shading model using a processing unit establishing at least one shading parameter in the region of the color image by implementing the ambient/diffuse shading model using the processing unit;

combining a new base color with the at least one shading parameter in the region of the color image thereby producing a re-colored region of the color image using the processing unit, wherein the ambient/diffuse shading model is implemented according to:

$$E_{total} = E_{base}(1 + k_{diffuse}(\cos\theta - 1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $$E_{total} = E_{light} E_{base}(k_{ambient} + k_{diffuse}\cos\theta)$$

which under the assumptions $$E_{light} = 1$$

$$k_{ambient} + k_{diffuse} = 1$$

simplifies to $$E_{total} = E_{base}(1 + k_{diffuse}(\cos\theta - 1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $$E_i = E_{base}(1 + k_{diffuse}(\cos\theta - 1))$$

where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i, or $$E_{c,i} = E_{c,base}(1 + k_{diffuse}(\cos\theta_i - 1))$$

where E is the energy relationship of light and color in the energy domain, $E_{c,i}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, where i represents a pixel within the region, $\theta_i$ being the angle formed at pixel i, and where the subscript c indicates a color channel, or $$E_{total} = E_{base}(1 + k_{diffuse}(\cos\theta - 1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein the base color $E_{base}$ is the original base color and is determined by identifying the maximum color of the region, where the surface normal is pointing directly toward the light source so that $\theta=0$ and $\cos\theta=1$, and:

$$E_{base} = \frac{E_{maximum}}{1 + k_{diffuse}(\cos(0) - 1)},$$
$$= E_{maximum}$$

or $$E_{total} = E_{base}(1 + k_{diffuse}(\cos\theta - 1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein the diffuse coefficient $k_{diffuse}$ is determined by identifying the minimum color of the region, where the surface normal is pointing away from the light source so that $\theta=\pi/2$ and $\cos\theta=0$, and:

$$E_{minimum} = E_{base}(1 + k_{diffuse}(\cos(\pi/2) - 1))$$

from which $k_{diffuse}$ is solved:

$$k_{diffuse} = (E_{base} - E_{minimum})/E_{base}, \text{ or}$$

$$E_i = E_{base}(1 + k_{diffuse}(\cos\theta_i - 1))$$

where E is the energy relationship of light and color in the energy domain, $E_i$ is the total color, $E_{base}$ represents the base color, the term $k_{diffuse}(\cos\theta_i-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i; and, wherein for each pixel i in the region, the value for $\cos\theta_i$ is computed from the shading model:

$$E_i = E_{base}(1 + k_{diffuse}(\cos\theta_i - 1))$$

which may be solved for $\cos\theta_i$ and simplified to:

$$\cos\theta_i = (E_i - E_{minimum})/(E_{base} - E_{minimum}), \text{ or}$$

$$E_{total} = E_{base}(1 + k_{diffuse}(\cos\theta - 1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein a new base color, $E_{base}'$ is substituted into the shading equation for each pixel in the region, producing a re-colored second region:

$$E_{total}'=E_{base}'(1+k_{diffuse}(\cos\theta-1))$$

where the prime, ', refers to the new base color, as opposed to the original base color.

2. A method for re-coloring according to claim 1 wherein the at least one shading parameter is established separate from the original base color.

3. A method according to claim 1 wherein when the ambient/diffuse shading model is implemented according to $E_{total}=E_{base}(1+k_{diffuse}(\cos\theta-1))$ the energy value, $E_{base}$, is computed according to one or more of red, green and blue values.

4. A method for re-coloring according to claim 1 wherein the original and new base colors include color components and the color components are transformed into and out of a three-dimensional, linear energy color space.

5. A method for re-coloring according to claim 1 wherein the original and new base colors include color components and the color components are transformed into and out of a three-dimensional, linear energy color space, the linear energy space including at least one of linear energy RGB and CIE XYZ.

6. A method for re-coloring according to claim 1 wherein the new base color is obtained from at least one of a two-dimensional texture map and a procedural source.

7. A method according to claim 1 wherein the original base color includes color components and the at least one shading parameter is computed from one or more of the color components.

8. A method according to claim 1 wherein the original base color includes color components and the at least one shading parameter is computed from the color component showing the largest variation.

9. A computer program product in a non-transitory computer-readable medium for use in a data processing system for executing a computer program, the computer program product comprising instructions for operating a method according to claim 1.

10. A computer program product in a non-transitory computer-readable medium for use in a data processing system for executing a computer program, the computer program product comprising:
first instructions for determining an original base color in a region of a color image based on an ambient/diffuse shading model;
second instructions for establishing at least one shading parameter in the region of the color image based on the ambient/diffuse shading model; and
third instructions for combining a new base color with the at least one shading parameter in the region of the color image thereby producing a re-colored region of the color image,
wherein the ambient/diffuse shading model is implemented according to:

$$E_{total}=E_{base}(1+k_{diffuse}(\cos\theta-1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $$E_{total}=E_{light}E_{base}(k_{ambient}+k_{diffuse}\cos\theta)$$

which under the assumptions $E_{light}=1$ $$k_{ambient}+k_{diffuse}=1$$

simplifies to $$E_{total}=E_{base}(1+k_{diffuse}(\cos\theta-1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $$E_i=E_{base}(1+k_{diffuse}(\cos\theta-1))$$

where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i, or $$E_{c,i}=E_{c,base}(1+k_{diffuse}(\cos\theta_i-1))$$

where E is the energy relationship of light and color in the energy domain, $E_{c,i}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel I, and where the subscript c indicates a color channel, or $$E_{total}=E_{base}(1+k_{diffuse}(\cos\theta-1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and
wherein the base color $E_{base}$ is the original base color and is determined by identifying the maximum color of the region, where the surface normal is pointing directly toward the light source so that $\theta=0$ and $\cos\theta=1$, and:

$$E_{base} = E_{maximum}/1 + k_{diffuse}(\cos(0)-1) = E_{maximum},$$

or $$E_{total}=E_{base}(1+k_{diffuse}(\cos\theta-1))$$

where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and
wherein the diffuse coefficient $k_{diffuse}$ is determined by identifying the minimum color of the region, where the surface normal is pointing away from the light source so that $\theta=\pi/2$ and $\cos\theta=0$, and:

$$E_{minimum}=E_{base}(1+k_{diffuse}(\cos(\pi/2)-1))$$

from which $k_{diffuse}$ is solved:

$k_{diffuse}=(E_{base}-E_{minimum})/E_{base}$, or $E_i=E_{base}(1+k_{diffuse}(\cos\theta_i-1))$ where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i, and, wherein for each pixel i in the region, the value for $\cos\theta_i$ is computed from the shading model:

$E_i=E_{base}(1+k_{diffuse}(\cos\theta_i-1))$ which may be solved for $\cos\theta_i$ and simplified to:

$\cos\theta_i=(E_i-E_{minimum})/(E_{base}-E_{minimum})$, or $E_{total}=E_{base}(1+k_{diffuse}(\cos\theta_i-1))$ where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein a new base color $E'_{base}$, is substituted into the shading equation for each pixel in the region, producing a re-colored second region:

$E'_{total}=E'_{base}(1+k_{diffuse}(\cos\theta_i-1))$ where the prime, ', refers to the new base color, as opposed to the original base color.

11. A method for identifying an original base color of a region of a color image, the method comprising:

evaluating the color content of the region of the color image by implementing an ambient/diffuse shading model using a processing unit; and, separating a set of one or more shading parameters for the region of the color image from the original base color by implementing the ambient/diffuse shading model using the processing unit;

wherein the ambient/diffuse shading model is implemented according to:

$E_{total}=E_{base}(1+k_{diffuse}(\cos\theta-1))$, where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $E_{total}=E_{light}E_{base}(k_{ambient}+k_{diffuse}\cos\theta)$ which under the assumptions $E_{light}=1$ $k_{ambient}+k_{diffuse}=1$ simplifies to $E_{total}=E_{base}(1+k_{diffuse}(\cos\theta-1))$ where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, or $E_i=E_{base}(1+k_{diffuse}(\cos\theta-1))$ where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i, or $E_{c,i}=E_{c,base}(1+k_{diffuse}(\cos\theta_i-1))$ where E is the energy relationship of light and color in the energy domain, $E_{c,i}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, where i represents a pixel within the region, $\theta_i$ being the angle formed at pixel i, and where the subscript c indicates a color channel, or $E_{total}=E_{base}(1+k_{diffuse}(\cos\theta-1))$, where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein the base color $E_{base}$ is the original base color and is determined by identifying the maximum color of the region, where the surface normal is pointing directly toward the light source so that $\theta=0$ and $\cos\theta=1$, and:

$$E_{base}=\frac{E_{maximum}}{1+k_{diffuse}(\cos(0)-1)}=E_{maximum},$$

or $E_{total}=E_{base}(1+k_{diffuse}(\cos\theta-1))$, where E is the energy relationship of light and color in the energy domain, $E_{total}$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image; and, wherein the diffuse coefficient $k_{diffuse}$ is determined by identifying the minimum color of the region, where the surface normal is pointing away from the light source so that $\theta=\pi/2$ and $\cos\theta=0$, and:

$E_{minimum}=E_{base}(1+k_{diffuse}(\cos(\pi/2)-1))$ from which $k_{diffuse}$ is solved:

$k_{diffuse}=(E_{base}-E_{minimum})/E_{base}$, or $E_i=E_{base}(1+k_{diffuse}(\cos\theta_i-1))$ where E is the energy relationship of light and color in the energy domain, $E_i$ is the total color, $E_{base}$ represents the base color, the term $k_{diffuse}(\cos\theta-1)$ represents the at least one shading parameter and $\theta$ is the angle formed between a surface normal in the region and a corresponding vector pointing toward a light source in the image, and where i represents a pixel within the region, $\theta_i$ being the angle formed at pixel i; and, wherein for each pixel i in the region, the value for $\cos \theta_i$ is computed from the shading model:

$E_i = E_{base}(1 + k_{diffuse}(\cos \theta_i - 1))$ which may be solved for $\cos \theta_i$ and simplified to:

$\cos \theta_i = (E_i - E_{minimum})/(E_{base} - E_{minimum})$, or $E_{total} = E_{base}(1 + k_{diffuse}(\cos \theta_i - 1))$ where E is the energy relationship of light and color in the energy domain, $E_{total}$ is the total color, $E_{base}$ represents the base color, the term $k_{diffuse}(\cos \theta - 1)$ represents the at least one shading parameter and $\theta$ is the angle formed between a surface normal in the region and a corresponding vector pointing toward a light source in the image; and, wherein a new base color, $E_{base}'$ is substituted into the shading equation for each pixel in the region, producing a re-colored second region:

$E_{total}' = E_{base}'(1 + k_{diffuse}(\cos \theta - 1))$ where the prime, ', refers to the new base color, as opposed to the original base color.

12. A method according to claim 11 wherein the separating operation is a mathematical representation of the base color and the one or more shading parameters.

* * * * *

UNITED STATES PATENT AND TRADEMARK OFFICE
CERTIFICATE OF CORRECTION

PATENT NO. : 7,990,381 B2  
APPLICATION NO. : 11/514481  
DATED : August 2, 2011  
INVENTOR(S) : Lindbloom Page 1 of 1

It is certified that error appears in the above-identified patent and that said Letters Patent is hereby corrected as shown below:

In the Claims:

Column 11, Claim 1, Line 50, please delete "$E_I = E_{base}(1 + k_{diffuse}(\cos\theta - 1))$", and insert -- $E_i = E_{base}(1 + k_{diffuse}(\cos\theta_i - 1))$ -- therefor;

Column 14, Claim 10, Line 14, please delete "$E_I = E_{base}(1 + k_{diffuse}(\cos\theta - 1))$" and insert -- $E_i = E_{base}(1 + k_{diffuse}(\cos\theta_i - 1))$ -- therefor;

Column 14, Claim 10, Line 32, please delete "pixel I" and insert -- pixel i -- therefor;

Column 16, Claim 11, Line 4, please delete "$E_I = E_{base}(1 + k_{diffuse}(\cos\theta - 1))$" and insert -- $E_i = E_{base}(1 + k_{diffuse}(\cos\theta_i - 1))$ -- therefor.

Signed and Sealed this  
Twelfth Day of June, 2012

David J. Kappos  
*Director of the United States Patent and Trademark Office*